United States Patent Office 2,881,074
Patented Apr. 7, 1959

2,881,074

GROWTH PROMOTANT SUBSTANCES

James Harwood, Western Springs, Ill., assignor to Armour and Company, Chicago, Ill., a corporation of Illinois No Drawing. Application July 29, 1955
Serial No. 525,383

16 Claims. (Cl. 99—2)

This invention relates to novel organic compounds which are useful as growth-promoting factors in animal nutrient materials. These growth-promoting factors are especially useful in growing and fattening chickens and hogs, but they may also be utilized advantageously in enhancing the feed efficiency of nutrient materials for other animals.

In one aspect of this invention there is contemplated a novel class of organic compounds characterized chemically by being composed of the cationic fragment of a cationic surfactant and the anionic fragment of an anionic polyelectrolyte selected from the group consisting of polyphospho acids, polysulfo acids, polycarboxy acids and salts thereof. By "polyphospho acids" we mean polymeric compounds containing a plurality of phosphorus acid groups. The polysulfo acids and polycarboxy acids can be defined in a similar manner. These compounds are useful in enhancing the feed efficiency of animal nutrient materials. Preferably, these organic compounds are water-insoluble compounds of the aforementioned character, and especially desirable compounds are obtained as cationic surfactant derivatives of the group of polyelectrolytes consisting of polyphosphonic acids, polysulfonic acids and polycarboxylic acids.

In another aspect of this invention there is contemplated an animal nutrient material containing as an essential ingredient at least one compound characterized chemically by being the water-insoluble salt of a cationic surface active substance. Especially desirable feed efficiency can be achieved when this animal nutrient material contains a water-insoluble compound characterized structurally as composed of the cationic fragment of a cationic surfactant and the anionic fragment of an anionic polyelectrolyte.

In relatively recent years antibiotics, such as aureomycin, have been incorporated into animal feeds to produce growth stimulation and improved feed efficiency. Also, there have been experimental indications that surface active agents may, under some conditions, stimulate growth, although not so effectively or so reliably as the antibiotics. Consequently, the feed additive field is still in the early stages of development, and there is still a considerable need for more effective and less expensive feed efficiency factors.

I have found that upon mixing at least one of these water-insoluble compounds with an animal nutrient material, e.g. water or an animal feed, an enhanced feed efficiency results comparable to that obtained with antibiotics. It is believed that in administering this animal nutrient material to, for example, hogs there is obtained controlled release and absorption of the water-insoluble compound or some fragment thereof, from the digestive tract. The mechanism of action for these water-insoluble compounds has not been completely elucidated, but the net result is an enhanced feed efficiency and promotion of growth in the animal.

The cationic fragment of these organic compounds may be derived from surface active quaternary ammonium salts, such as the alkyltrimethylammonium halides, dialkyldimethylammonium halides, trialkylmethylammonium halides, wherein the alkyl group (or groups) can contain from 8 to 22 carbon atoms and can be saturated or unsaturated. Instead of an alkyl group of the character described, the surface active quaternary ammonium compound can contain an aromatic group, such as the benzyl group, and thus the cationic fragment of this reaction product can be obtained from such compounds as alkylbenzyldimethylammonium halides. We mention, for example, such specific cationic surfactants from which this cationic fragment can be derived as dimethyldidecylammonium chloride, trimethyldodecylammonium chloride, dimethyldioctadecylammonium chloride, trimethyloctadecylammonium chloride, dodecyldimethylbenzylammonium chloride, octadecyldimethylbenzylammonium chloride, (p-diisobutylphenoxyethoxy)ethylbenzyldimethylammonium chloride, trimethyloctylammonium chloride, dimethyldodecylbenzylammonium chloride and methyltrioctadecylammonium chloride. Also, mixtures of different cationic surfactants can be employed, such as the naturally occurring mixtures where the quaternary ammonium compound is prepared from a natural fatty acid source. For example, trimethyl "coco" ammonium chloride, dimethyldi "tallow" ammonium chloride, trimethyl "soya" ammonium chloride, etc., are suitable sources for the cationic fragment of this reaction product. This cationic fragment may also be derived from surface active primary, secondary and tertiary amines, such as alkylamines, dialkylamines, dimethylalkylamines, bis(2-hydroxyethyl)alkylamines and N-alkyl-1,3-propanediamines, wherein the amines contain at least one alkyl chain having from 8 to 22 carbon atoms. By way of specific example, we mention such suitable amines as octadecylamine, dimethyloctadecylamine, bis(2-hydroxyethyl)octadecylamine, methyldioctadecylamine, dioctadecylamine, dimethyldodecylamine, and N-dodecyl-1,2-propanediamine. Further, polyamines, such as N-dodecyltrimethylenediamine and cyclic nitrogen compounds such as 1-alkylpyridinium halies, e.g. octadecylpyridinium chloride, can be employed to derive the cationic fragment of this reaction product.

The anionic fragment of these organic compounds may be derived from any anionic polyelectroylte, such as polysulfonic acids, e.g. hexasulfonic acid (suramin) and polysulfonic acid resins (Amberlite IR-105); non-polymeric polysulfonic acids, e.g. acidic azo dyes such as Trypan Red and Direct Blue BB; polysulfuric esters, e.g. agar-agar and carrageen mucilage; polycarboxylic acids, e.g. polyacrylic acid, weak cation exchange resins, arabic acid, alginic acid, pectic acid; polysaccharinic acids such as carboxymethyl cellulose, oxidized starch, mucin, hyaluronic acid, polyglucuronic acid, and acids derived from naturally occurring gums such as tragacanth, locust bean, quince seed, linseed, karaya and acacia; mixed polycarboxylic acids and polysulfuric acid ester, e.g. heparin and chondroitin sulfuric acid; polyphosphonic acids, e.g., Duolite C-61; polyphosphoric esters, e.g. Duolite C-65 and phytic acid (hexaphosphoric acid ester); and polysilicates, e.g. bentonite.

The organic compounds of this invention can be prepared by dissolving the cationic surfactant, e.g., trimethyloctadecylammonium chloride, in a solvent such as isopropyl alcohol, and adding the resulting solution to an alkalinized solution of the anionic polyelectrolyte, e.g. phytic acid. This alkalinization of the anionic polyelectrolyte solution results in the conversion thereof to the metal salt, e.g. an alkali metal salt of the anionic polyelectrolyte such as sodium phytate. This reaction mixture can then be heated to a temperature in the order of 40 to 80° C., and maintained at such temperature until the reaction has been completed. Thereafter, the reaction product, e.g. trimethyloctadecylammonium phytate, can be obtained as a dry product by dehydrating the reaction mixture in, for example, a vacuum oven.

In the preferred practice of this invention at least one of these water-insoluble compounds may be combined with a diluent or a nutrient substance as a "premix." This premix may then be combined with an animal feed prior to consumption by the animal. For example, a suitable premix product may be prepared by combining 20% of the water-insoluble salt of a cationic surfactant and 80% of steamed bone meal. This steamed bone meal not only serves as an excellent diluent for the growth-promotant substance, but also supplies minerals in a natural form and concentration suitable for the animal diet. However, especially in the case of non-ruminant animals such as chickens and hogs, it has been found that the range of concentration for these growth-promotant substances in the animal nutrient material is rather wide, i.e. relatively large amounts of these substances can be orally administered to the animals to enhance feed efficiency without undesirable toxic effects.

This invention can be more fully illustrated by the following specific examples:

*Example I*

Trimethyloctadecylammonium phytate was prepared by the following method:

Phytic acid in the amount of 10 grams (0.0154 mole) was dissolved in 50 ml. of water and charged into a 250 ml. Erlenmeyer flask. To this solution was added 7.4 g. (0.185 mole) of sodium hydroxide dissolved in 35 ml. of water. Trimethyloctadecylammonium chloride (Arquad HT), in the amount of 63 grams (0.185 mole), was dissolved in 36 ml. of isopropyl alcohol and slowly added to the sodium phytate solution which was undergoing continuous agitation. The mixture was heated to a temperature of 60–70° C. and maintained at such temperature until all the Arquad HT had been added. The reaction mixture was poured into trays while hot, and then dried in a steam-heated vacuum oven. The dry product was obtained in a yield of 70 g.

*Example II*

Trimethyloctadecylammonium pectate was prepared by the following method:

Pectic acid (technical) in the amount of 131 grams (0.5 mole), was dissolved in 200 ml. of water and charged into a 600 ml. beaker. To this solution was added 20 grams (0.05 mole) of sodium hydroxide in 100 ml. of water. This thick solution was added to 339 grams of 52% trimethyloctadecylammonium chloride (0.5 mole) in isopropyl alcohol, with stirring. After the reaction had been completed the reaction mixture was poured onto trays while hot and dried on a steam bath. The yield of dry product was 385 g.

*Example III*

Trimethyloctadecylammonium carboxymethylcellulose was prepared by the following method:

Sodium carboxymethylcellulose, in the amount of 118 grams, and 339 g. of 52% trimethyloctadecylammonium chloride in isopropyl alcohol were charged into a Waring Blendor. The reaction was effected while mixing. The gel-like product was partially dried in a tray on a steam bath. The semi-dried gel was then ground in a Waring Blendor using Dry Ice to keep the mass solid. Bonemeal, in an amount equivalent to 4 times the weight of the semi-dried gel, was slowly added to the Waring Blendor while mixing, to yield a final product that contained 20% by weight of active trimethyloctadecylammonium carboxymethylcellulose.

*Example IV*

Bentonite, in the amount of 10 grams, and 20 grams of 52% active trimethyloctadecylammonium chloride were intimately mixed until a thick paste had formed. This paste material was added to 100 grams of bonemeal in a Waring Blendor. Upon mixing a dry powder was obtained containing approximately 15% by weight of active trimethyloctadecylammonium bentonite.

*Example V*

Trimethyloctadecylammonium suramin (m-aminobenzoyl-m-amino-p-methylbenzoyl - 1 - naphthylamino-4,6,8-trisulfonate carbamide) was prepared by the following method:

A solution of 27.05 grams of 52% active trimethyloctadecylammonium chloride (Arquad HT) was intimately mixed with 9.52 grams of suramin to prepare Arquad HT-suramin salt. This mixture was added to 90.4 grams of bonemeal with stirring. The resulting mixture was dried, yielding an animal nutrient product containing approximately 20% by weight of active trimethyloctadecylammonium suramin.

*Example VI*

Trimethyloctadecylammonium phytate (hereinafter designated as A), trimethyloctadecylammonium carboxymethylcellulose (hereinafter designated as B) and trimethyloctadecylammonium pectate (hereinafter designated as C) were tested for feed efficiency in chickens in comparison with penicillin, trimethylrosinammonium stearate (hereinafter designated as D) and trimethyloctadecylammonium stearate (hereinafter designated as E).

Three hundred (300) unsexed Arbor Acres White Rock chicks, obtained from the Rothway Hatchery, Chicago Heights, Illinois, were weighed and placed in electrically heated brooders. These chicks were fed for a period of 7 days on a basal ration having the following composition:

| | Percent |
|---|---|
| Ground yellow corn | 64.0 |
| Soybean meal (44%) | 23.5 |
| Dried skim milk | 2.0 |
| Meat and bone scrap (50%) | 4.0 |
| Alfalfa meal (17%) | 2.5 |
| Steamed bonemeal | 1.5 |
| Ground limestone | 1.0 |
| Iodized salt | 0.45 |
| Manganese sulfate | 0.05 |
| Vitamin premix* | 1.00 |

*The vitamin premix employed herein contains the following:

| | Concentration per lb. of premix | Concentration per lb. of basal ration |
|---|---|---|
| Riboflavin | 2 grams | 1 mg. |
| Niacin | 20 grams | 10 mg. |
| Ca Pantothenate | 10 grams | 5 mg. |
| Vitamin $B_{12}$ [1] | 9 mg. | 45 mcg. |
| Choline | 454 grams | 227 mg. |
| Vitamin A [2] | 3,000,000 units | 1,500 units. |
| Vitamin D [2] | 600,000 units | 300 units. |
| Finely ground corn | 5,947 grams | |

[1] Vitamin $B_{12}$ obtained from Pfizer Company and identified as Bicon 6 containing 6 mg. of vitamin $B_{12}$ per pound.
[2] Nopco dry vitamin A and vitamin $D_3$.

Of these 300 chicks, 266 were randomly assigned to 19 test lots. The growth-promotant substances, A, B, C, D and E, were mixed with steamed bonemeal on the basis of 20% by weight to obtain a "premix" product. These premixed products were incorporated into the basal ration at the rate of 37.5 mg. per pound, i.e. 75 gms. of growth-promotant substance per ton of feed. The penicillin was included in the basal ration at the rate of 5 gms. per ton. All basal rations were further supplemented with 1% of stabilized tallow.

The growth-promotant substances A, B, C and D and penicillin-supplemented basal rations were fed each to 3 of the 19 test lots of chicks, while growth promotant substance E was fed to a single lot of chicks. Also, 3 of such test lots were maintained on the basal ration without supplementation, except for one percent (1%) stabilized tallow, as a control.

The chicks were fed these rations for a period of 8 weeks, and consequently the final weights are based upon 9 weeks old chicks. The following table summarizes the growth and feed-efficiency data:

| Supplement to basal ration | Number of chicks | Mortality (8 weeks), percent | Average final weight of chicks (grams) | Difference in weight of chicks test vs. control (grams) | Feed efficiency [1] |
|---|---|---|---|---|---|
| None | 42 | 2.37 | 1,218 | | 2.53 |
| Penicillin | 42 | 7.14 | 1,346 | 10.5 | 2.35 |
| A | 42 | 2.37 | 1,282 | 5.2 | 2.49 |
| B | 42 | 0.00 | 1,292 | 6.0 | 2.40 |
| C | 42 | 0.00 | 1,249 | 2.5 | 2.42 |
| D | 42 | 4.76 | 1,246 | 2.2 | 2.38 |
| E | 14 | 0.00 | 1,255 | 3.0 | 2.43 |

[1] Feed efficiency is defined as grams of feed consumed to produce a weight gain of one gram.

These tabulated results indicate that increased growth rates and feed efficiencies were obtained when the basal ration was supplemented with penicillin and with the growth promotant substances of this invention.

While in the foregoing specification, various embodiments of this invention have been set forth and specific details thereof elaborated for the purpose of illustration, it will be apparent to those skilled in the art that this invention is susceptible to other embodiments and that many of these details can be varied widely without departing from the basic concept and spirit of the invention.

I claim:

1. A composition of matter comprising an animal nutrient material mixed with a water-insoluble compound characterized chemically by being composed of the cationic fragment of a quaternary ammonium surfactant and the anionic fragment of an anionic polyelectrolyte.

2. The composition of claim 1 in which said quaternary ammonium surfactant is a trimethyloctadecylammonium surfactant.

3. The composition of claim 1 in which the anionic polyelectrolyte is a polyphosporic acid.

4. The composition of claim 3 in which the polyphosphonic acid is suramin.

5. The composition of claim 1 in which the anionic polyelectrolyte is a polyhposphoric ester.

6. The composition of claim 5 in which the polyphosphoric ester is a phytate.

7. The compoistion of claim 1 in which the anionic polyelectrolyte is a polysilicate.

8. The composition of claim 7 in which the polysilicate is bentonite.

9. The composition of claim 1 in which the anionic polyelectrolyte is a polycarboxylic acid.

10. The composition of claim 9 in which the polycarboxylic acid is pectic acid.

11. The composition of claim 9 in which the polycarboxylic acid is derived from naturally occurring gums.

12. The composition of claim 9 in which the polycarboxylic acid is a polysaccharinic acid.

13. The composition of claim 12 in which the polysaccharinic acid is carboxymethylcellulose.

14. A composition of matter comprising a hog nutrient material mixed with trimethyloctadecylammonium phytate.

15. A composition of matter comprising a poultry nutrient material mixed with trimethyloctadecylammonium pectate.

16. A composition of matter comprising a chick nutrient material mixed with trimethyloctadecylammonium carboxymethylcellulose.

References Cited in the file of this patent

UNITED STATES PATENTS

| | | |
|---|---|---|
| 2,314,277 | Hurd | Mar. 16, 1943 |
| 2,520,123 | Carson | Aug. 29, 1950 |
| 2,586,407 | Walsh et al. | Feb. 19, 1952 |
| 2,594,302 | Ehrensperger | Apr. 29, 1952 |
| 2,617,707 | Daul et al. | Nov. 11, 1952 |
| 2,689,245 | Merrill | Sept. 14, 1954 |
| 2,700,683 | Tesoro | Jan. 25, 1955 |
| 2,717,208 | Ely et al. | Sept. 6, 1955 |
| 2,717,209 | Ely et al. | Sept. 6, 1955 |
| 2,721,812 | Iler | Oct. 25, 1955 |

OTHER REFERENCES

Ely et al.: Distillers Feed Conference Proc., March 12, 1952, pp. 72–84.

UNITED STATES PATENT OFFICE
CERTIFICATE OF CORRECTION

Patent No. 2,881,074

April 7, 1959

James Harwood

It is hereby certified that error appears in the printed specification of the above numbered patent requiring correction and that the said Letters Patent should read as corrected below.

Column 5, line 44, for "polyphosporic" read -- polyphosphonic --.

Signed and sealed this 29th day of September 1959.

(SEAL)
Attest:

KARL H. AXLINE
Attesting Officer

ROBERT C. WATSON
Commissioner of Patents